US005409754A

United States Patent [19]
Yasuda et al.

[11] Patent Number: 5,409,754
[45] Date of Patent: Apr. 25, 1995

[54] IN-MOLD LABEL WITH COUPON

[75] Inventors: Jun-ichi Yasuda, Tokyo; Masaaki Yamanaka, Ibaraki, both of Japan

[73] Assignee: Oji Yuka Goseishi Co., Ltd., Tokyo, Japan

[21] Appl. No.: 113,099

[22] Filed: Aug. 30, 1993

[30] Foreign Application Priority Data

Sep. 10, 1992 [JP] Japan .................. 4-242161

[51] Int. Cl.6 ............................................ B42D 15/00
[52] U.S. Cl. ........................................ 428/43; 40/306; 40/310; 428/131; 428/137; 428/192; 428/194; 428/200; 428/204; 428/213; 428/220; 428/323; 428/327; 428/347; 428/349; 428/354; 428/910
[58] Field of Search ................ 428/43, 41, 42, 40, 428/131, 137, 156, 172, 173, 192, 194, 195, 200, 204, 213, 220, 323, 327, 349, 354, 910, 347, 515, 516; 264/509, 129; 40/310, 299, 306

[56] References Cited

U.S. PATENT DOCUMENTS 4,986,866  1/1991  Ohba .................... 156/220
5,223,315  6/1993  Katsura ................ 428/36.92
5,254,302 10/1993  Yamanaka ............. 264/129

Primary Examiner—Nasser Ahmad
Attorney, Agent, or Firm—Oblon, Spivak, McClelland, Maier & Neustadt

[57] ABSTRACT

An in-mold label with a coupon composed of a base layer having formed on the back side thereof an adhesive layer, in which said base layer comprises a biaxially stretched resin film, a part of the adhesive layer has a formation density of 50% or less to form a less adhesive zone, with at least one end of the less adhesive zone remaining non-adhesive to provide a stripping starting part having a width of from 5 to 10 mm measured from the end of the less adhesive zone to the direction of stripping and an area ratio of not more than 30% based on the total area of the less adhesive zone, the surface of the base layer corresponding to the less adhesive zone has printed thereon a coupon, and the periphery of the printed coupon is perforated. The in-mold label, after integrally molded with a resin container, suffers from no blister, and the coupon can easily be stripped off the container with fingers.

13 Claims, 3 Drawing Sheets

IN-MOLD LABEL WITH COUPON

FIELD OF THE INVENTION

This invention relates to an in-mold label with a coupon which is to be adhered to a synthetic resin container simultaneously with the production of the container by differential pressure forming or blow molding. More particularly, it relates to an in-mold label with a coupon which is inserted in a mold beforehand and integrally molded with a thermoplastic resin by blow molding, vacuum forming or pressure forming to provide a label-decorated synthetic resin container.

BACKGROUND OF THE INVENTION

Production of label-decorated containers comprising inserting a label in a mold and then molding a container by injection molding, blow molding, differential pressure forming or foam molding has previously been reported (see JP-A-58-69015; the term "JP-A" as used herein means an "unexamined published Japanese patent application, U.S. Pat. No. 4,986,866, EP-A-502396 and EP-A-254923). Labels to be used for this in-mold decorating, called in-mold labels, are generally made of natural pulp paper or plastic films.

Included in such label-decorated containers are those with a label containing a coupon which is to be separated from the label after the purchase of the label-decorated container.

In order for the coupon to be separated easily, the periphery of the coupon is usually perforated, and the coupon is prevented from sticking to the container by coating a parting agent on the adhesive layer at the part corresponding to the coupon or by applying no adhesive to the part corresponding to the coupon.

However, when such a coupon, being not adhered to the container, has a large area, it is apt to lift to form a blister due to shrinkage of the container after integral molding, and the poor appearance considerably reduces the commodity value.

Further, it is difficult to put a finger under the coupon to peel off the coupon.

In order to overcome the above problems, the present inventors previously proposed an in-mold label with a coupon composed of a base layer comprising a biaxially stretched film and an adhesive layer, in which a part of the adhesive layer is in a band form, and has a formation density of 50% or less to make the corresponding part of the base layer easily strippable with notches being provided at one end of the coupon on the strippable band (see Japanese Patent Application No. Hei-3-60884).

However, since the in-mold label is pressed onto the wall of a container on integral molding, the label and the container are tightly adhered with no air gap. Besides, the adhesive layer is spread nearly up to the end of the coupon from which stripping is to be started. Therefore, it is not easy to pick up the end of the coupon with one's finger nail or finger to make a hold for starting stripping. Accordingly, it was still difficult to peel off the coupon.

SUMMARY OF THE INVENTION

Accordingly one object of the present invention is to provide an in-mold label with a coupon which exhibits a satisfactory appearance without suffering from blisters after integral molding with a resin container.

Another object of the present invention is to provide an in-mold label with a coupon which, after being integrally molded with a resin container, can be stripped off easily from the container.

As a result of extensive investigations, the inventors have found that the above objects of the present invention are accomplished by (1) using a biaxially stretched resin film as a base layer, (2) making a part of the adhesive layer in a band form less adhesive by reducing the formation density to 50% or less (the adhesive layer having a formation density of 50% or less will hereinafter be referred to as a less adhesive zone) while applying no adhesive to at least one end of the less adhesive zone to provide a free end from which one can start stripping (the end part with no adhesive applied will hereinafter be referred to as a stripping starting part), (3) printing a coupon on the surface of the base layer corresponding to the less adhesive zone, and (4) perforating the periphery of the printed coupon. The present invention has been completed based on this finding.

The present invention provides an in-mold label with a coupon composed of a base layer having formed on the back side thereof an adhesive layer, in which the base layer comprises a biaxially stretched resin film, a part of the adhesive layer has a formation density of 50% or less to form a less adhesive zone, with at least one end of the less adhesive zone remaining non-adhesive to provide a stripping starting part having a width of from 5 to 10 mm measured from the end and an area ratio of not more than 30% based on the total area of the less adhesive zone, the surface of the base layer corresponding to the less adhesive zone has printed thereon a coupon, and the periphery of the coupon is perforated.

DETAILED DESCRIPTION OF THE INVENTION

Figure 1:
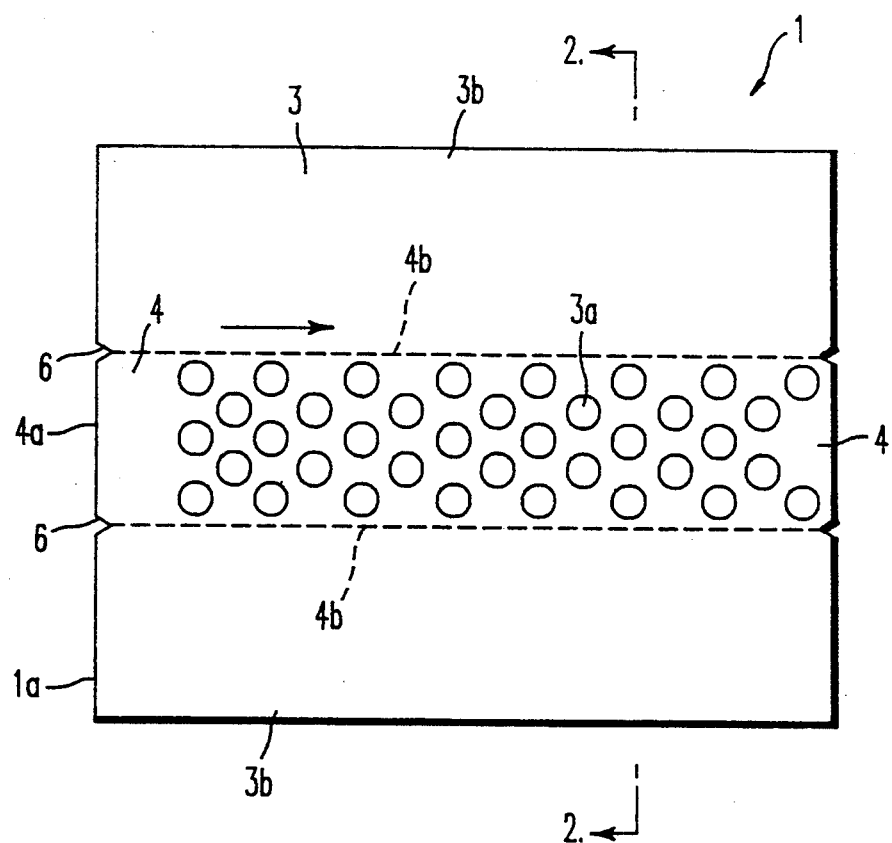
FIG. 1 is a back side of an in-mold label with a coupon according to the present invention.
Figure 2:
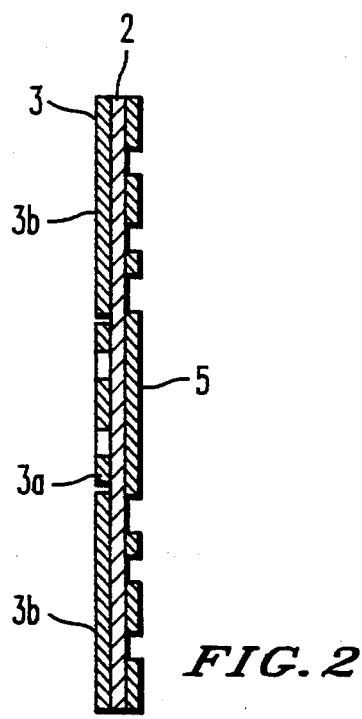
FIG. 2 is a cross section of FIG. 1 along line A—A.

The in-mold label with a coupon according to the present invention is a label for in-mold decorating of a synthetic resin container in differential pressure forming or blow molding. As shown in FIGS. 1 and 2, in-mold label 1 is basically composed of a base layer 2 comprising a biaxially stretched resin film and an adhesive layer 3 formed on the side of base layer 2 to be in contact with a container. In a part of the adhesive layer 3, a formation density of adhesive layer 3 is reduced to 50% or less to provide a less adhesive zone 4. On the surface of base layer 2 on the part overlaying the area corresponding to the less adhesive zone 4 is printed a coupon 5. No adhesive is applied to at least one end of the less adhesive zone 4 to form non-adhesive stripping starting part 4a. Perforations 4b are formed on both sides of the printed coupon 5.

After in-mold label 1 with coupon 5 is adhered to a container by in-mold decorating, coupon 5 can easily be removed from the container by picking up the stripping starting part 4a with a finger and stripping coupon 5 apart from the rest of the label along perforations 4b.

The biaxially stretched resin film which can be used as the base layer 2 includes a biaxially stretched film of a thermoplastic resin having a melting point of from 135° to 264° C., such as polypropylene, high-density polyethylene, polyvinyl chloride, polyethylene terephthalate and polyamide and polymer blends thereof, especially a blend of high-density polyethylene and polypropylene, which may contain an inorganic fine powder, such as calcium carbonate, calcium sulfate, calcined clay, diatomaceous earth, barium sulfate, titanium oxide, mica or talc, in an amount usually of from 8 to 55% by weight, preferably 15 to 40% by weight. The inorganic fine powder has a particle size of not greater than 15 μm, preferably between 0.05 μm and 5 μm.

The base layer may also comprise suitable additives conventionally known to those of ordinary skill in the art in the field of in-mold labels, such as weathering agents such as TiO2, antioxidants such as butylated hydroxy toluene, MARK 329 (produced by Asahi Denka Kogyo K.K.) and sterically hindered phenol IRGANOX-1076 (produced by Ciba-Geigy Aktiengesellschaft), dispersants such as oleic acid and stabilizers such as bis(2,2,6,6-tetramethyl-4-piperidyl)sebacate (produced by Sankyo Co., Ltd.).

The base layer 2 may have a single layer structure or a laminate structure consisting of two or more layers or may further have formed thereon, a surface layer. For example, the above-mentioned biaxially stretched thermoplastic resin film having coated thereon a latex coating containing an inorganic filler, such as calcium carbonate, calcium sulfate, clay, titanium oxide or talc; a composite film composed of the above-mentioned biaxially stretched thermoplastic resin film and a metal deposit layer of aluminum, etc.; and laminated synthetic paper composed of the above-mentioned inorganic fine powder-containing biaxially stretched thermoplastic resin film having on one or both sides thereof a uniaxially stretched resin film containing 8 to 65% by weight of an inorganic fine powder (U.S. Pat. No. 4,318,950) are also useful as base layer 2. The total thickness of the base layer 2 may be from 30 to 300 μm, preferably 70 to 150 μm. Such laminated synthetic paper is commercially available under trade names of Yupo FPG, Yupo SGG, Yupo TPG, Yupo GFG, and Yupo KPG (all produced by Oji Yuka Goseishi Co., Ltd.), PEARL SYNTHETIC PAPER (produced by Toyo Spinning Co., Ltd.), and POLYART II (produced by BXL Co., Ltd.).

It is important that base layer 2 should be oriented by biaxial stretching so that coupon 5 may be neatly separated apart from the rest of label 1, starting from stripping starting part 4a and along side perforations 4b. Formation of two or more notches 6 at the end(s) of coupon 5 demarking the perforations will help pick up stripping starting part 4a and strip coupon 5 off the container.

In printing coupon 5 on base layer 2, the orientation direction of base layer 2 should be taken into consideration because the stripping direction of coupon 5 should agree with the orientation direction of base layer 2. The stretch ratio in the stripping direction is from 3 to 10, preferably 4 to 8, and that in the direction perpendicular to the stripping direction is usually from 3 to 10, preferably 4 to 10.

Adhesive layer 3 is formed on the back side of base layer 2 (the side to be in contact with a resin container) for fusion to a resin container. Adhesive layer 3 usually comprises a heat-sealable resin having a melting point of from 82° to 135° C., such as low-density polyethylene, a vinyl acetate-ethylene copolymer, an ethylene-acrylic acid copolymer, an ethylene-methacrylic acid copolymer, a styrene-ethylene copolymer or a metal salt thereof (i.e., $Li^+$, $K^+$, $Na^+$, $Zn^{+2}$ or $Al^{+3}$).

Where a molten film of the heat-sealable resin is laminated on the base layer 2 to form adhesive layer 3, the film thickness is from 1 to 30 μm, and preferably from 1 to 10 μm. Where the heat-sealable resin is coated, an emulsion or a solution in a solvent (e.g., toluene, mineral spirit, petroleum ether or ethyl cellosolve) is coated on base layer 2 followed by drying to form adhesive layer 3. The resulting film thickness is from 1 to 30 μm, and preferably from 1 to 10 μm. The emulsion or solution has a preferred viscosity of 20 to 300 cps at 25° C.

In the present invention, adhesive layer 3 is not uniformly formed on the entire back side of base layer 2. That is, a less adhesive zone 4 in which adhesive layer 3 (shown by symbol 3a in FIG. 1) has a formation density of not more than 50%, preferably from 5 to 50%, and more preferably from 10 to 45%, is formed in a band form. The terminology "formation density of adhesive layer" as used herein means an area ratio of the adhesive layer 3a in the total area of the less adhesive zone 4. Coupon 5 is printed on the surface of the base layer 2 corresponding to the less adhesive zone 4 so that the part of the base layer on less adhesive part 4 may be stripped apart to provide coupon 5.

Accordingly, both ends of the less adhesive zone 4 extend to the full length of label 1, and adhesive layer 3 is partitioned by less adhesive zone 4.

Stripping starting part 4a having a width of from 5 to 10 mm, preferably from 6 to 8 mm as measured beginning from an end, where no adhesive is applied, is provided at one or both ends of less adhesive zone 4. The term "width of stripping starting part 4a" as used herein means a distance measured from the end of less adhesive zone 4 in the direction of stripping. If the width of stripping starting part 4a is less than 5 mm, one cannot put their finger thereunder sufficiently to start stripping. If it exceeds 10 mm, the free end will be curled or lifted to deteriorate the appearance. The length of the stripping starting part 4a (corresponding to the width of the less adhesive zone 4 or coupon 5) is usually from 8 to 30 mm.

The area of stripping starting part 4a should not exceed 30% of the total area of coupon 5. If it exceeds 30%, coupon 5 is liable to be peeled before purchase.

Perforations 4b are formed on both sides of the less adhesive zone 4 so as to make coupon 5 be easily stripped off.

In-mold label 1 and resin container 11 can be adhered firmly by the heat-sealable resin film (adhesive layer 3). In cases where the resin of container 11 is the same composition as the resin constituting base layer 2, adhesive layer 3 may be omitted. This can be achieved by applying a parting agent, such as a silicone resin, in a dot form, a stripe form, a check form, etc, directly to the base layer 2, on an area corresponding to coupon 5, at an area ratio of more than 50%, preferably between more than 50% and less than 95% and more preferably, between more than 55% and less than 90%, based on the total area of coupon 5. Parting agent is also applied to the area corresponding to the stripping starting part 4a.

The area of less adhesive zone 4 is from 10 to 70%, preferably from 30 to 50%, based on the total area of label 1.

Less adhesive zone 4 having a formation density of not more than 50% is preferably formed by applying adhesive 3a in dots (as shown in FIG. 1), polka dots, stripes or checks.

In the production of the in-mold label with a coupon according to the present invention, a biaxially stretched film is prepared by stretching the above-described thermoplastic resin film having a melting point of from 135° to 264° C. which may contain usually from 8 to 55% by weight of the above-mentioned inorganic fine powder or a laminate of the thermoplastic resin film and a heat-sealable resin film serving as adhesive layer 3 by simultaneous biaxial stretching, by blown-film extrusion or by use of a mandrel or by successive biaxial stretching in which a T-die extruded film is first stretched in the machine direction by means of rolls and then stretched in the transverse direction with the both sides being clamped.

The stretch ratio is usually from 3 to 10 times, preferably 4 to 8 times, in the machine direction and from 3 to 10 times, preferably from 4 to 10 times, in the transverse direction.

Stretching is carried out at a temperature below the melting point of base layer 2. Where stretching is preceded by laminating of base layer 2 and adhesive layer 3, stretching should be carried out at a temperature of not less than the melting point of the heat-sealable resin of adhesive layer 3 so that the heat-sealable resin layer may not undergo stretching.

If desired, on the surface of the biaxially stretched film, a latex coating containing inorganic filler, as described above may be coated, or a metal, e.g., aluminum, may be deposited to form a metal foil layer, or a uniaxially stretched inorganic fine powder-containing film may be laminated when the inorganic fine powder is defined as above.

Adhesive layer 3 is applied on the back side of base layer 2 for fusion to a resin container on integral molding.

Adhesive layer 3 comprises the above-mentioned heat-sealable thermoplastic resin having a melting point of from 82° to 135° C. Application of adhesive layer 3 can be carried out by fusion bonding of a film comprising the heat-sealable resin or by coating the heat-sealable resin as an emulsion or as a solution in an appropriate solvent followed by drying.

As previously explained, adhesive layer 3 is not formed on the entire back side of base layer 2. That is, it is applied to the part except less adhesive zone 4 where adhesive layer 3a is formed at a density of not more than 50%.

Figure 3:
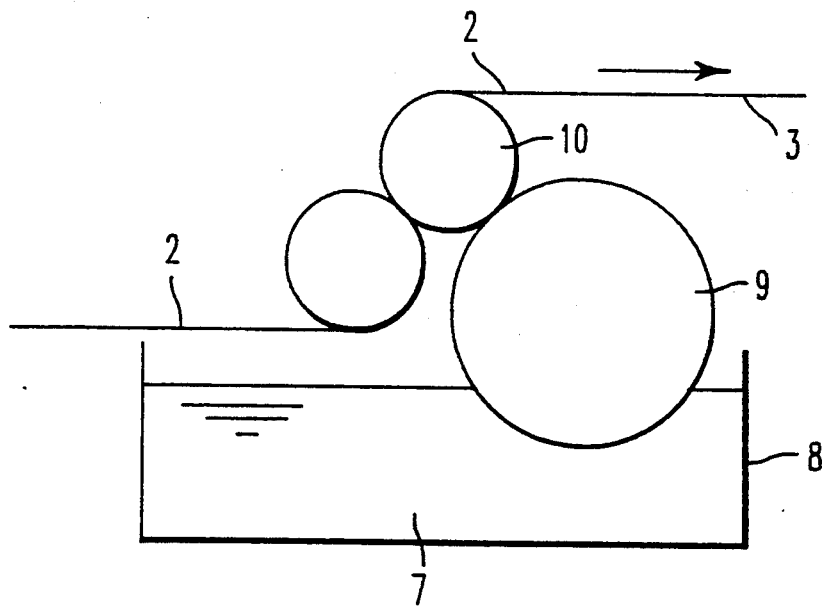
FIG. 3 is a schematic view of a coating apparatus for coating a liquid heat-sealable resin with a gravure roll to form an adhesive layer.

Formation of such an adhesive layer 3 including adhesive layer 3b partitioned by less adhesive layer 3a can be achieved by means of, for example, a coating apparatus as shown in FIG. 3. Heat-sealable resin liquid 7 (an emulsion of a heat-sealable resin or a solution of a heat-sealable resin in a solvent) in coating pan 8 is picked up by rotating roll 9, transferred to gravure roll 10 rotating in contact with roll 9, transferred to the back side of base layer 2, and dried.

Figure 4:
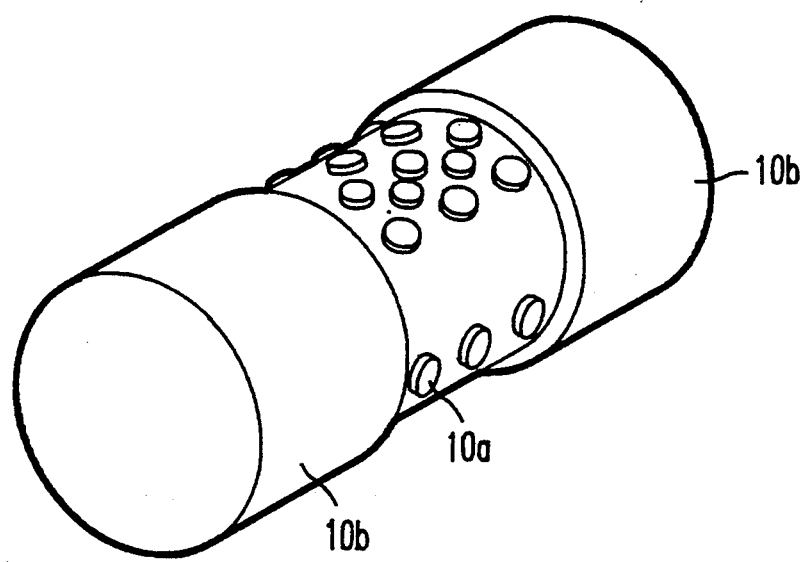
FIG. 4 is a perspective view of the gravure roll used in the coating apparatus of FIG. 3.

As shown in FIG. 4, the surface of gravure roll 10 is composed of convex bands 10b on each end thereof to provide solid adhesive layers 3b and convex portion 10a having a dot form, a stripe form or a check form distributed at the central portion thereof at an area ratio of not more than 50% so as to provide dot-, stripe- or check-patterned less adhesive zone 4 having a formation density of not more than 50%, with part of the central portion in the direction of rotation having no convex portion 10a at all so as to provide stripping starting part 4a.

Adhesive layer 3b on the back side of base layer 2 which corresponds to the part other than less adhesive zone 4 is formed to a high density of formation of higher than 50%, and preferably 100% (i.e., on the entire surface of the back side except for less adhesive zone 4).

There is thus provided base layer 1 having coated on the back side thereof adhesive layer 3b and less adhesive layer 3a with no adhesive applied to the end of less adhesive layer 3a to provide a stripping starting part 4a which can be picked up with fingers and from which stripping of coupon 5 is started easily.

Alternatively, the adhesive layer comprising adhesive layer 3b partitioned by less adhesive layer 3a can be formed by applying an adhesive layer on the entire back side of base layer 2 by extrusion and applying a parting agent, such as a silicone resin, in a dot form, a stripe form, a check form, etc. to the adhesive layer corresponding to coupon 5 at an area ratio of more than 50%, preferably between more than 50 and less than 95%, and more preferably between more than 55 and less than 90%, based on the total area of coupon 5. Parting agent is also applied to the area corresponding to the stripping starting part 4a.

Anyway, it is essential to reduce the density of formation of an adhesive layer in the part corresponding to coupon 5 to 50% or less to provide less adhesive zone 4.

If desired, the above-described stretched laminate film may be subjected to a corona discharge treatment, a flame treatment, a plasma treatment or a like surface treatment to improve printability or adhesiveness.

Coupon 5 is printed on a part of the surface of base layer 2, for example, a paper-like layer, which corresponds to the above-mentioned less adhesive zone 4 by various printing techniques, such as gravure printing, offset printing, flexographic printing, and screen printing. Other pieces of necessary information, such as a trade name, a maker's name, a seller's name, a character, a bar code, instructions, etc. are printed on the other part of base layer 2.

In-mold label 1 of the present invention may be used as a small-sized label to be adhered to part of the surface of a container but is usually produced as a blank for surrounding the side wall of a cup type container in differential pressure forming or as a label to be adhered to the front and the back of a bottle type container in blow molding.

A printed sheet is then die-cut to obtain labels 1 of desired shape and size. In this stage of production, perforations 4b are formed on both sides of the printed coupon for easy stripping. If desired, a pair of notches 6 having an appropriate shape (e.g., V-shaped or I-shaped) may be formed on one or both ends of coupon 5.

Figure 5:
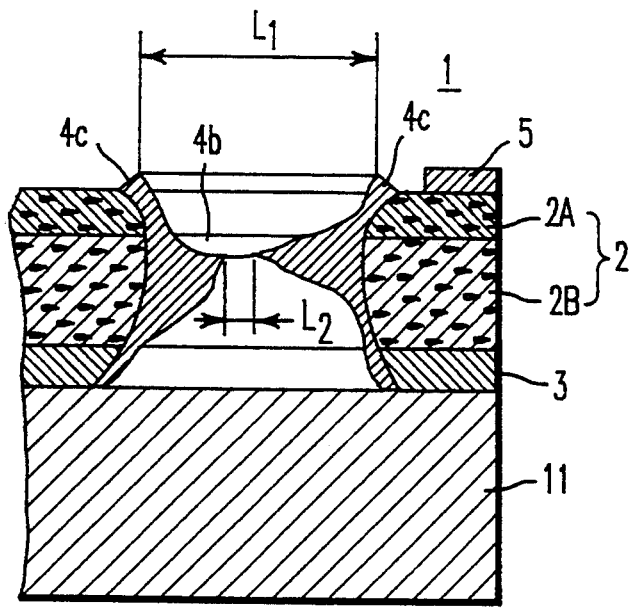
FIGS. 5 and 6 are each a partial cross section of a container in-mold decorated with an in-mold label with a coupon according to the present invention.

Perforating can be performed by means of hot needles, an electron beam, or a laser beam. It is preferable that perforating is carried out from the same side as the adhesive layer to make through-holes having a diameter of from 100 to 2000 μm at intervals of from 0.5 to 3 mm. In this case, the perforated side of adhesive layer 3 remains smooth, while that of base layer 2 develops crater-like projections 4c having a height of from 18 to 85 μm from the surface of base layer 2 as shown in FIG. 5. Since the perforated side of adhesive layer 3 is smooth, coupon 5 can easily be stripped from label 1.

Where base layer 2 is a laminate film composed of a biaxially stretched resin film 2B (core layer) and a uniaxially stretched resin film 2A (paper-like layer), the diameter ($l_2$) of perforation 4b in core layer 2B and its vicinities, when observed on the cross section thereof, is narrower than that ($l_1$) in paper-like layer 2A and its vicinities due to a difference in the planer stretch ratio between core layer 2B and paper-like layer 2A.

Figure 6:
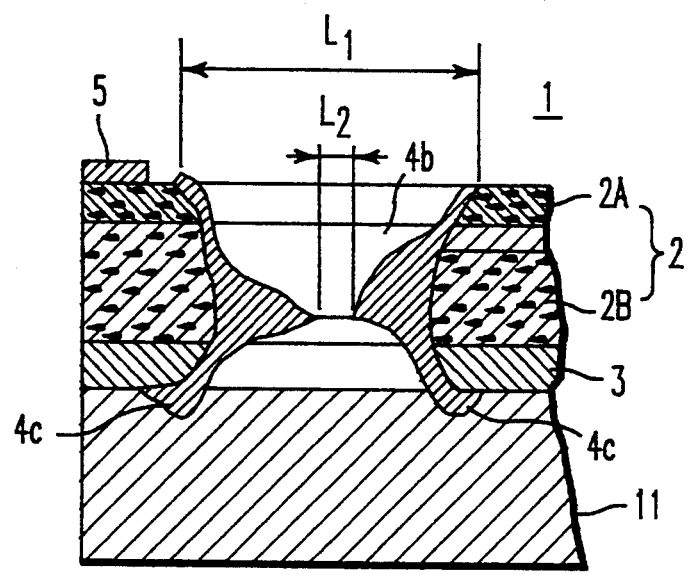

If label 1 is perforated from the printed side thereof, the perforated side of adhesive layer 3 develops crater-like projections 4c, which will bite the outer wall of container 11 on integral molding, as shown in FIG. 6. In this case, stripping of coupon 5 off the container will require increased pulling force.

The in-mold label with a coupon according to the present invention is set in a mold cavity for differential pressure forming (e.g., vacuum forming or pressure forming) or for blow-molding with its printed side in contact with the mold wall and fixed there by suction by conventional means known to those of ordinary skill in the art. A molten resin parison or a molten resin sheet is introduced into the cavity and molded in a usual manner to provide a container on which the label is fusion-bonded.

Since the label is previously fixed to the inner wall of a mold and integrally molded with a resin container, the label is firmly adhered to the container body without undergoing deformation or blistering to provide a labeled container with a satisfactory appearance.

Coupon 5 printed on the label can easily be separated from the other parts of the label by picking up stripping starting part 4a provided at end 1a with fingers and then pulling to tear off coupon 5 along perforations 4b.

The present invention will now be illustrated in greater detail with reference to Examples, but it should be understood that the present invention is not construed as being limited thereto. All the parts and percents are by weight unless otherwise indicated.

EXAMPLE 1

Preparation of Base Layer

Composition A consisting of 69 parts of polypropylene (MITSUBISHI NOBLEN MA-6, produced by Mitsubishi Petrochemical Co., Ltd.; melting point: about 164° C.), 8 parts of high-density polyethylene (YUKARON HARD EY-40, produced by Mitsubishi Petrochemical Co., Ltd.; melting point: about 134° C.), 0.8 part of titanium oxide having an average particle size of 1 μm as a weathering agent, 0.06 part of bis(2,2,6,6-tetramethyl-4-piperidyl) sebacate (SANOL LS-770, produced by Sankyo Co., Ltd.), 22.2 parts of calcined clay, 0.3 part of an antioxidant, and 0.1 part of oleic acid as a dispersant was melt-kneaded in an extruder and extruded from a die at 200° C. After cooling to about 50° C., the extruded sheet was again heated to 150° C. and stretched 4 times in the machine direction by making use of a difference in peripheral speed of rolls to obtain stretched film A.

Separately, composition B consisting of 55 parts of polypropylene (MITSUBISHI NOBLEN MA-6), 42 parts of calcium carbonate having an average particle size of 0.8 μm, 3 parts of titanium oxide having an average particle size of 1 μm, 0.4 part of bis(2,2,6,6-tetramethyl-4-piperidyl)sebacate, 0.1 part each of YO-SHINOX BHT (produced by Yoshitomi Pharmaceutical Industries, Ltd.), MARK 329 (produced by Asahi Denka Kogyo K.K.) and IRGANOX-1076 (produced by Ciba-Geigy Aktiengesellschaft) as antioxidants, and 0.1 part of oleic acid was melt-kneaded in two separate extruders and extruded from the respective die at 200° C. to prepare two resin films B.

Resin film B was laminated on both sides of stretched film A. After cooling to a temperature higher than room temperature by 20° C., the laminate was again heated to about 155° C., stretched 8 times in the transverse direction by means of a tenter, and subjected to heat setting by passing through an oven at 160° C. The laminate was then subjected to a corona discharge treatment to obtain synthetic paper excellent in printability and writability having a three layer structure composed of a 70 μm thick core layer A and surface and back layers B each having a thickness of 10 μm. Each of the three layers contained a number of microvoids (void volume: 30%), and the whole synthetic paper had a specific gravity of 0.712.

Laminating of Adhesive Layer

A 55% toluene solution of an ethylene-vinyl acetate copolymer resin (vinyl acetate content: 14%) was coated on the back side of the resulting synthetic paper by means of a coating apparatus shown in FIG. 3 using a gravure roll shown in FIG. 4 to provide an adhesive layer having a pattern as shown in FIG. 1. The adhesive layer pattern comprised a 15 mm wide solid band on one side, a 12 mm wide solid band on the other side, and a 10 mm wide dot-patterned band forming a less adhesive zone being interposed therebetween, in which dots each having a diameter of 2 mm were arranged at a pitch of 8 mm. No adhesive was applied to the 5 mm area from one end of the less adhesive zone to provide a stripping starting part. The stripping starting part had an area ratio of 10% based on the total area of the less adhesive zone.

Printing

The resulting sheet was subjected to a corona discharge treatment. A coupon was printed on the part of the paper-like surface layer B corresponding to the less adhesive zone with the other information, such as a trade name, a maker's name, a seller's name, a character, a bar code, instructions, etc., on the other parts.

Die-Cutting and Notching

The printed sheet was die-cut into 3.7 cm wide and 5 cm long labels having a reverse appearance as shown in FIG. 1 while perforating both sides of the printed coupon from the side of the adhesive layer by means of hot needles to make holes of about 0.7 mm in diameter ($l_1$) at intervals of about 0.7 mm. The surface of the perforated adhesive layer side was smooth while the perforated paper-like layer had crater-like projections 4c having a height of 25 μm around each hole. The narrowest diameter of the hole ($l_2$) in the thickness direction was 62 μm. Further, a V-shaped notch was given to each corner of the coupon.

In-Mold Decoration

The resulting in-mold label 1 was fixed to the inner wall of one of split-cavity blocks for blow molding (kept at 20° C.) by suction with its printed side (layer B) contacting the mold. High-density polyethylene (melting point: 134° C.) was melt-extruded at 180° C. into the cavity to form a tubular parison, and the split blocks were clamped. Compressed air of 4.2 kg/cm² was introduced into the parison to expand it to a shape of a container and to fuse the label to the container. The mold was cooled and opened to remove the hollow container.

required for stripping the coupon. The results obtained are also shown in Table 1.

TABLE 1

| Example No. | Stripping Starting Part Width(mm) | Area Ratio in Less Adhesive Zone(%) | Direction of V-Shaped Notches | Blister | Strippability of Coupon | Lifting from Container | Force Required for Stripping(g) |
| --- | --- | --- | --- | --- | --- | --- | --- |
| Example 1 | 5 | 10 | stretching direction | none | easy | none | 100 |
| Example 2 | 10 | 20 | stretching direction | none | easy | none | 80 |
| Compar. Example 1 | 15 | 30 | stretching direction | observed | easy | observed | 10 |
| Compar. Example 2 | 0 | 0 | stretching direction | none | difficult (delamination) | none | 450 |
| Example 3 | 5 | 10 | stretching direction | none | difficult (cross tearing) | none | 220 |
| Example 4 | 5 | 10 | stretching direction | none | easy | none | 110 |

The label on the hollow container suffered from no fading of the print, no shrinkage or no blister, and the coupon portion showed no lifting from the container.

When the notched stripping starting part at one end of the label was picked up and pulled up with fingers, the coupon portion could be removed neatly and easily along the perforations.

When the feed of the in-mole label to the split was consecutively conducted 100 times by the use of an automatic label feeder, no failure, such as a fall of the label off the mold wall, took place probably because the label was reinforced by the wall of the perforations.

EXAMPLE 2

An in-mold label with a coupon was prepared in the same manner as in Example 1, except that the stripping starting part was formed up to a distance of 10 mm from one end of the less adhesive zone so as to have an area ratio of 20% based on the total area of the less adhesive zone. A labelled container was produced in the same manner as in Example 1.

COMPARATIVE EXAMPLES 1 AND 2

An in-mold label with a coupon was prepared in the same manner as in Example 1, except that the stripping starting part was formed up to a distance of 15 mm from one end of the less adhesive zone so as to have an area ratio of 30% based on the total area of the less adhesive zone (Comparative Example 1) or no stripping starting part was formed (Comparative Example 2). A labelled container was produced in the same manner as in Example 1.

EXAMPLE 3

An in-mold label with a coupon was prepared in the same manner as in Example 1, except that the label was perforated from the side of the paper-like layer. A labelled container was produced in the same manner as in Example 1.

EXAMPLE 4

An in-mold label with a coupon was prepared in the same manner as in Example 1, except that the label was perforated to make holes having a diameter ($l_1$) of 1.5 mm at an interval of 2.8 mm. A labelled container was produced in the same manner as in Example 1.

The particulars of the in-mold labels prepared in the foregoing Examples and Comparative Examples are shown in Table 1 below. Each label adhered on the container was evaluated in terms of development of blisters, ease in stripping of the coupon with fingers, lifting of the label from the container, and the force According to the present invention, one can easily put one's finger under the end of a coupon portion on the label to pick it up and separate the coupon accurately along the perforations. After the in-mold label is integrally molded with a resin container, the coupon portion does not lift from the container wall to keep a satisfactory appearance.

While the invention has been described in detail and with reference to specific examples thereof, it will be apparent to one skilled in the art that various changes and modifications can be made therein without departing from the spirit and scope thereof.

What is claimed is:

1. An in-mold label with a strippable coupon comprising:
    A) a base layer comprising a biaxially stretched resin film; and
    B) an adhesive layer;
    wherein said adhesive layer is formed on one side of said base layer to be in contact with a container to provide a back surface layer, said adhesive layer comprising:
    i) a center portion, having an area ratio of from 10 to 70% based on the total area of said in-mold label, positioned at the center of said in-mold label having an adhesive layer at an area ratio of from 5 to 50% based on the total area of said center portion;
    at least one end of said center portion remaining without adhesive to provide a stripping starting part having a width of from 5 to 10 mm measured from the end of said center portion to the direction of stripping and an area ratio of not more than 30% based on the total area of said center portion; and
    ii) two side portions located on opposite side of said center portion and having an adhesive layer at an area ratio of >50% based on the total area of said side portions;
    the surface of said base layer opposite to said adhesive layer having printed thereon a coupon corresponding the area of said center portion,
    wherein said label is perforated along the area corresponding to the periphery of said coupon.

2. The in-mold label with a strippable coupon of claim 1, wherein said periphery of the coupon is perforated from the side of the adhesive layer to form perforations.

3. The in-mold label with a coupon of claim 2, wherein said perforations have a diameter of from 100 to 2000 μm at intervals of from 0.5 to 3 mm, and the perforated side of said adhesive layer has a smooth surface while that of said base layer has projections.

4. The in-mold label with a strippable coupon of claim 1, wherein a notch is provided to each of the two corners of the printed coupon on at least one end thereof having said stripping starting part.

5. The in-mold label with a strippable coupon of claim 1, wherein said center portion has an adhesive layer at an area ratio of from 10 to 45%.

6. The in-mold label with a strippable coupon of claim 1, wherein said biaxially stretched resin film comprises a polypropylene resin.

7. The in-mold label with a strippable coupon of claim 1, wherein said base layer comprises an inorganic fine powder-containing biaxially stretched resin film as a core layer having laminated on at least the surface side thereof an inorganic fine powder-containing uniaxially stretched resin film as a layer.

8. A container comprising a molded container and the in-mold label with strippable coupon of claim 1.

9. The in-mold label with a strippable coupon of claim 1, wherein said biaxially stretched film comprises a thermoplastic resin having a melting point of from 135° to 264° C.

10. The in-mold label with a strippable coupon of claim 1, wherein said base layer further comprises an inorganic fine powder in said resin film.

11. The in-mold label with a strippable coupon of claim 1, wherein said adhesive layer comprises a heat-sealable resin having a melting point of from 82° to 135° C.

12. The in-mold label with a strippable coupon of claim 1, wherein said adhesive layer has a film thickness of from 1 to 30 $\mu$m.

13. The in-mold label with a strippable coupon of claim 1, wherein said centered portion is formed by applying a parting agent to said adhesive layer.

* * * * *